United States Patent [19]

Veyhl

[11] 4,072,433
[45] Feb. 7, 1978

[54] THREE-TUBE CORNER JOINT

[75] Inventor: Wolf Veyhl, Zwerenberg, Germany

[73] Assignee: Veyhl-Produktion KG, Zwerenberg, Germany

[21] Appl. No.: 674,100

[22] Filed: Apr. 6, 1976

[30] Foreign Application Priority Data

Apr. 10, 1975 Germany ............................ 2515569

[51] Int. Cl.$^2$ ............................ F16D 1/00; F16D 3/00
[52] U.S. Cl. ................................... 403/172; 403/176; 403/405
[58] Field of Search ................. 403/231, 49, 170–172, 403/176, 217, 219, 401, 403, 361, 373, 374, 382, 405, 409; 52/753 C, 753 D, 753 F, 758 F, 758 C; 24/263 B, 263 LL

[56] References Cited

U.S. PATENT DOCUMENTS

| 1,882,678 | 10/1932 | Thum | 52/753 D UX |
|---|---|---|---|
| 2,588,818 | 3/1952 | Franks | 403/217 |
| 2,669,497 | 2/1954 | Bailey | 403/231 |
| 2,788,096 | 4/1957 | Franks | 403/176 |
| 2,874,708 | 2/1959 | Daus | 403/172 |

*Primary Examiner*—Wayne L. Shedd
*Attorney, Agent, or Firm*—Spencer & Kaye

[57] ABSTRACT

A joint assembly for three tube sections forming the corner of a tube frame, includes a tensioning piece having ends which are hooked into openings provided in mutually facing sides of the first and second tube sections. A tensioning bolt extends through a hole in the tensioning piece and engages in a diagonally disposed threaded hole of the third tube section. The mutually facing sides of the first and second tube sections are exclusively restrained at locations which are immediately adjacent to two opposing walls of the first and second tube sections. The tensioning piece has a U-shaped cross section in a plane which is perpendicular to the common plane in which the first and second tube sections are located. The tensioning piece includes a transverse web extending transversely to the first and second tube sections and two spaced-apart legs which are parallel to the common plane in which the first and second tube sections are located. The U-shape is defined by the transverse web and the two spaced-apart legs. The mutually facing sides of the first and second tube sections have slots immediately adjacent to the opposing walls. The legs of the tensioning piece have boundary portions which engage in these slots. The bolts bears against the transverse web of the tensioning piece.

21 Claims, 5 Drawing Figures

THREE-TUBE CORNER JOINT

The present invention relates to a joint assembly for three tube sections forming the corner of a frame of tubes of which a first tube section and a second tube section are located in the same plane and the ends of which are pressed by means of a tensioning bolt against the lateral faces of a third tube section which is arranged perpendicularly to the common plane, said tensioning bolt extending through a hole in a tensioning piece the ends of which are hooked into openings provided in the mutually facing sides of the first and the second tube sections and said tensioning bolt engaging in a diagonally disposed threaded hole of the third tube section.

An edge joint of this type is similar to the edge joint generally employed for the joint between the parts of a table rim and the table leg in the wood furniture manufacture. However, it has been found that the stability of an edge joint of this type is not sufficient for a tube frame because the forces exerted by the hooked-in clamping piece on the wall portions of the tube sections result in an outward camber of the wall portions under deformation of the tube cross section. Due to the stressing of the tube frame during the normal use slackening of the parts occurs in the course of time, making the tube frame useless. Edge joints of this type therefore gained no general acceptance in practice. On the contrary, efforts have been made to develop edge joints using edge pieces having trunnions which engage the ends of the tube sections to be joined together. However, even in this case there are considerable problems to achieve the desired stability because here again deformations may easily occur or because it is difficult to keep the tolerances required for the production of a stable and durable joint. In contrast to this, it would be easy to produce a joint of the aforementioned type without paying attention to large tolerances. Accordingly, it is the object of the present invention to design a joint of the aforementioned type in such a manner that slackening will not occur even in the case of high stressing.

According to the invention this object is achieved by a design in which the walls are exclusively restrained at points which are immediately adjacent to the walls perpendicularly extending thereto and/or in which the walls are loaded in the direction of the walls perpendicularly extending thereto.

By means of the step according to the invention it is achieved that the forces exerted on the tube sections are essentially acting as shear forces and not as bending forces which cause deformation of the tube cross-section. The forces required for shearing off the material, for example, of a steel tube, are four times larger than the forces required for bending the relatively thin-walled tubes. These forces are also considerably larger than the forces occurring even during high stressing of a tube frame of this type. In particular, the shear strength is of the same order of magnitude as the strength that could be obtained by welding. However, a bolted joint according to the invention can be produced much easier than a welded joint because a welded joint requires a considerable amount of manual work for trimming the welding seams.

In a preferred embodiment of the invention the tensioning piece has a U-shaped cross-section and engages with boundary portions of its legs into slots provided in the mutually facing sides of the first and the second tube sections immediately adjacent to the walls extending perpendicularly to these sides, while the bolt bears against the transverse web of the tensioning piece, said transverse web extending diagonally to the two tube sections. It is evident that in this case the stressing of the tube sections is symmetrical in parallel to the walls extending in the tensioning direction so that essentially these forces may only cause material strain and/or shearing off of the material sections which are adjacent to these wall portions and are engaged by the legs of the tensioning piece, but they may not cause bending of the wall parts. The boundary portions of the tensioning piece engaging into the tube sections may constitute webs of sufficient height to safely prevent bending or straining in this area, too.

For holding the tube pieces together it is particularly expedient, if, in further development of the invention, the legs of the tensioning piece have slots into which the wall portions engage at the mutually facing sides of the two tube sections. Thus, these wall portions are braced on either side so that the tube sections already assume a defined position prior to the final assembly, which considerably facilitates the assembly. Furthermore, in this manner it is possible to take up bending moments on a relatively large basis which might tend to modify the angle formed between the coplanar tube sections. For this purpose it is particularly useful if the slots in the legs of the tensioning piece are open towards the joined ends of the tube sections and if the legs have a portion extending as far as to the corner formed by the two tube sections, said portion bearing against the external surfaces of the two tube sections. Finally, the transverse web of the tensioning piece may additionally be provided with lobes at either end which rest against the external surfaces of the tube sections. In this case the lobes may not only serve for increasing the spring base of the tensioning piece at the two tube sections, but also for fixedly connecting, for example riveting, the tensioning piece to one of the adjacent tube sections, in order to simplify the assembly. This step is particularly advantageous in cases where the individual tube sections of a stand are forwarded in the disassembled condition and are only connected by the dealer or even by the ultimate consumer to form the desired stand.

The threaded hole in the third tube section will normally be provided in a clamping piece which is arranged inside of the third tube section because the wall of the tube section itself will be too thin as to be provided with a thread taking up the tension forces. In order to achieve a restraint also in this case in places which are immediately adjacent to the walls extending perpendicularly thereto, a preferred embodiment of the invention provides that the clamping piece disposed inside of the third tube section and having a threaded hole essentially braces itself in those corners of the third tube section on which the other two wall sections abut with the wall portions lying at the external surfaces which are facing away from one another. This results in clamping of the walls of the third tube section between the first or second tube section and the clamping piece in a place immediately adjacent to the wall of the third tube section lying in the extension of the first or second tube section. Here again, the above-described favourable force distribution is obtained.

It may be advantageous that the clamping piece essentially fills the corner of the third tube section between the walls against which the other tube sections abutt, however, it may form a slightly more obtuse angle than these walls so that it remains essentially clear of these walls. A clamping piece of this type, having, for example, a triangular cross-section, is sufficiently thick as to accommodate a threaded hole withstanding the tension forces, it is sufficiently stable as to transmit the tension forces to the walls of the third tube section and—apart from the above-mentioned diametrically opposite points—it is sufficiently clear of the walls of the third tube section so that surface irregularities and contaminations within the third tube section do not result in deformation and instability of the third tube section due to wrong bearing of the clamping piece. In order to enable considerable moments to be taken up also in this case it is expedient to provide bracing on a large basis. The clamping piece may therefore advantageously have a length two to three times the cross-section of the third tube section.

For fixing the clamping piece in the desired position the third tube section may be provided with at least one embossment. This embossment may expediently be disposed near the holes for the tensioning bolt because in this place it is not visible from outside and can also be attached most easily.

The walls of the third tube section may also be provided with at least one protrusion for fixing the position of the adjacent tube sections. This may considerably simplify the assembly. Furthermore, it is expedient if the outside surface of the first and/or second tube section approximately recedes by the amount of the wall thickness of the tube section relative to the adjacent surface of the third tube section. Thus, on the one hand, the edge of the clamping piece inside of the third tube section and the front face of the outer wall of the first and/or second are exactly facing each other so that these sections firmly clamp the wall of the third tube section. Moreover, this step—even if the tube sections are not absolutely sharp-edged—also allows to achieve a clean connection of the first and second tube sections to the third tube section without rework being necessary, providing that the first and second tube sections have clean cut surfaces.

The invention is also applicable in cases where the first and second tube sections have different widths. In this case it is only necessary to dispose the hole in the tensioning piece at a sufficient distance off the centre of the clamping piece so that said hole extends diagonally to the cross-section of the third tube section because the tensioning bolt must in any case be arranged diagonally to the third tube section.

In the following the invention is described and explained in detail, reference being made to the embodiments shown by way of example in the accompanying drawing. In other embodiments of the invention, features apparent from the specification and the drawing may be applied either individually or in any desired combination of a plurality of such features. In the accompanying drawing FIG. 1 is a perspective view of a joint of three tube sections forming the corner of a tube frame;

Figure 1:
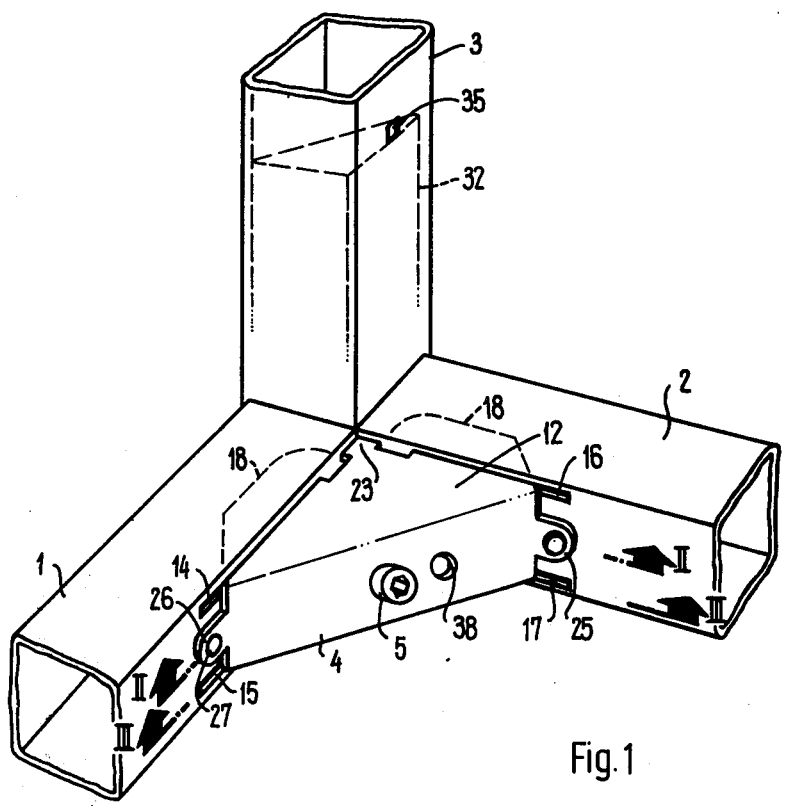
Figure 2:
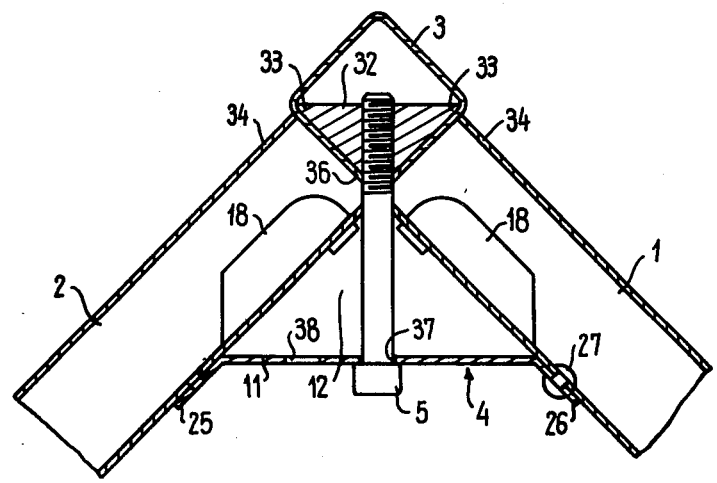
FIG. 2 is a section through the joint according to FIG. 1, taken along the line II—II.
Figure 3:
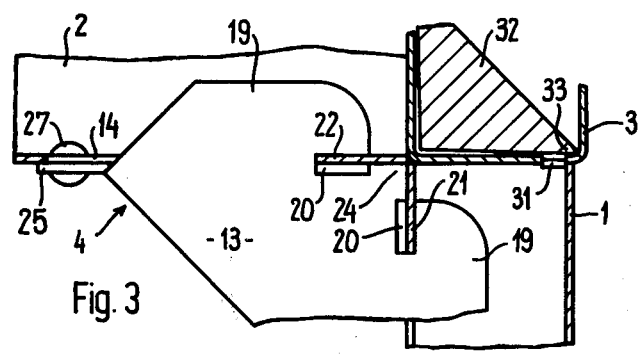
FIG. 3 is a part section on an enlarged scale through the joint according to FIG. 1, taken along the line III—III.

The corner of a tube frame represented in FIG. 1 through 3 comprises three tube sections 1, 2 and 3 of which the first and the second tube sections 1 and 2 are lying in the same plane and constitute, for example, parts for a table frame, while the third tube section 3 is disposed perpendicularly to this plane and may, for example, constitute a table leg. The first and second tube sections 1 and 2 abutt with the ends on the lateral faces of the third tube section 3 and are connected with one another and with the third tube section by means of a tensioning piece 4 and a tensioning bolt 5. The third tube section 3 has a square cross-section, whereas the first and second tube sections 1 and 2 have a rectangular cross-section which has the same dimension in the direction of the third tube section as the square third tube section, which, however, is smaller approximately by the amount of the wall thickness of the tube sections in the transverse direction to the third tube section. When using steel tubes, commonly employed dimensions are for example 30 mm × 30 mm for the third tube section and 30 mm × 28 mm for the first and second tube sections. The arrangement is designed such that the mutually facing sides of the first and second tube sections meet one another at the edges and are accordingly aligned with the corresponding sides of the third tube section, whereas the outer sides of the first and second tube sections facing away from one another are receding relative to the corresponding outer surfaces of the third tube section, as can be clearly seen from FIGS. 2 and 3. Thus, it is ensured that the two coplanar tube sections 1 and 2 are faying with the external surfaces of the third tube section, even if the tube section edges are slightly rounded off.

The tensioning piece 4 is of a U-shaped design and has a transverse web 11 extending diagonally to the two coplanar tube sections 1 and 2 as well as two legs 12 and 13 extending parallel to the walls of the first and the second tube sections, respectively lying in the same plane. The legs 12 and 13 are spaced at such a distance that they exactly fit between the corresponding walls of the tube section 1 and 2. The mutually facing sides of the walls of the tube sections 1 and 2 are provided with slots 14 and 15 or 16 and 17 into which boundary portions 18 and 19 of legs 12 and 13 of the U-shaped tensioning piece 4 are engaging. Moreover, the legs 12 and 13 of the tensioning piece 4 are also provided with slots 20 into which the wall portions 21 and 22 are engaging on the mutually facing sides of the two tube sections 1 and 2. These slots 20 are open towards the joined ends of the tube sections. The slots 14 through 17 in the tube sections 1 and 2 have such lengths that the boundary portions 18 and 19 of the legs 12 and 13 of the tensioning piece 4 can be introduced into these slots. By displacing the tube sections in the longitudinal direction relative to the tensioning piece 4 the wall portions 21 and 22 can then be introduced into the corresponding slots of the tensioning piece. As can be seen, the legs 12 and 13 of the tensioning piece respectively have a portion 23 or 24 which extend into the corner formed by the two tube sections 1 and 2, said tube sections 1 and 2 safely bearing against said portion in their final position, while they are braced at the inside by the flanks (delimiting the slot 20) of the boundary portion 18 or 19 of the legs of the tensioning piece 4, said boundary portion extending into the tube section 1 or 2. The coplanar tube sections 1 and 2 are further braced on the outside by means of lobes 25 and 26 at the ends of the transverse web 11 of the tensioning piece 4, said lobes being provided with holes to enable the tensioning piece to be secured to one or both of the coplanar tube sections 1 and 2. In the embodiment represented the tensioning piece 4 is connected to the tube section 1 represented on the LH side in FIG. 1 by means of a rivet 27. A connection of this type is not required to ensure the stability of the assembled edge joint. However, it may be expedient to secure the tensioning piece to the two adjoining tube sections, for example in cases where closed frames, to which the buyer has to screw on the legs only, are to be prefabricated and forwarded. In case the frame is also to be forwarded in the disassembled condition, it may be expedient to secure the corner piece to a frame part in order to avoid separate packing of the tensioning piece, to prevent loss of the tensioning piece and to facilitate the assembly by the buyer.

It is evident, that after the joining of the U-shaped tensioning piece and the two coplanar frame sections an already stable structure is obtained because, due to the engagement of the legs of the tensioning piece into the slots of the frame sections, on the one hand, and due to the engagement of the wall portions of the frame sections into the slots of the legs of the tensioning piece, on the other hand, an exactly defined geometrical coordination is achieved which already shows a considerable inherent stability because all parts are retained on both sides. It is therefore very easy to fit the third tube section into the corner thus formed. In the embodiment represented the third tube section has a protrusion 31, respectively, on the sides on which the other tube sections 1 and 2 abutt, said protrusion fitting into the extreme corner of the adjacent tube section, as shown in FIG. 3. Thus, the position of the third tube section 3 is also defined and this tube section can be easily tightened in the correct position by means of the tensioning bolt 5. The threaded hole for the bolt 5 is located in a clamping piece 32 which is inserted into the third tube section 3. Clamping piece 32 has a triangular cross-section and is arranged so that its longest side lies in the diagonal of the third tube section, the tensioning bolt 5 being arranged perpendicularly to said diagonal. The tip of the triangle faces the tensioning bolt 5 and essentially fills the corner of the third tube section formed by the walls on which the other tube sections 1 and 2 abutt. However, as can be clearly seen, in particular from FIG. 3, the clamping piece 32 has a slightly more obtuse angle than the third tube section so that the clamping piece 32 essentially bears with the ends of its sides only which adjoin the diagonal. Since the coplanar tube sections 1 and 2 are slightly narrower than the third tube section 3, the edges 33 of the clamping body 32 adjoining the diagonal face the outer walls 34 of the adjacent tube sections 1 and 2. Thus, it is ensured that, when tightening the tensioning bolt 5, the wall portions of this tube section immediately adjoining the outer walls of the third tube section 3 are firmly clamped between the edges 33 and the opposite wall portions 34 of the tube sections 1 and 2 without any forces possibly occurring which might deform the third tube section if the clamping body 32 does not bear in the vicinity of its edges 33, but, due to surface irregularities of the tube walls or due contaminations, at a point not exactly defined in the region between the edges of the third tube section. In order to ensure good taking up of the bending moments the clamping body 32 approximately has two to three times the length of one dimension of the tube cross-section. For keeping the clamping body 32 in the third tube section in place prior to the assembly, in the embodiment represented one wall of this tube section is provided with the embossment 35 supporting the clamping body 32 at one end as seen in FIG. 1. Instead of this, such an embossment could also be provided in a place where it engages into a cutout provided on one surface of the clamping body 32. A simple possibility would also consist in that the third tube section 3 be slightly impressed near the hole 36 through which the tensioning bolt 5 extends in order to hold the clamping body 32 in position.

Figure 4:
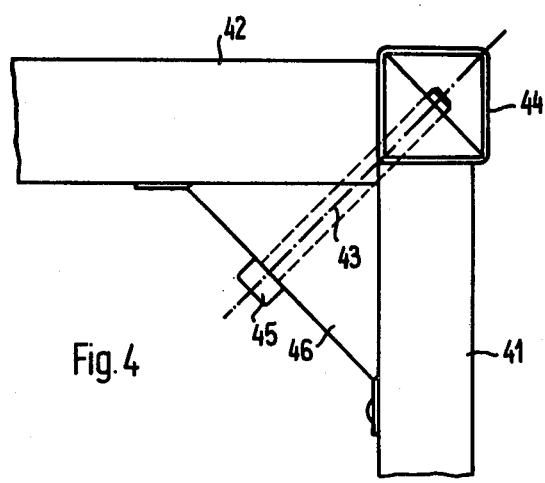
FIG. 4 is a top plan view of a joint similar to FIG. 1 with tube sections of different widths.

As can be seen, the tensioning bolt 5 with its head braces itself against the outside of the transverse web 11 of the U-shaped tensioning piece 4, said transverse web being provided with a hole 37 through which the tensioning bolt 5 is projecting. This hole is located in the centre of the transverse web 11. However, a further hole 38 is additionally provided which may also accommodate the tensioning bolt, if—as represented in FIG. 4—coplanar frame parts 41 and 42 are used which have different dimensions in the common plane. In this case, the diagonal 43 to the third tube section 44 on which the tensioning bolt 45 must be located is arranged off the centre of the tensioning piece 46. Otherwise, the arrangement according to FIG. 4 can be designed in the same manner as the arrangement described on the basis of FIGS. 1 through 3.

Figure 5:
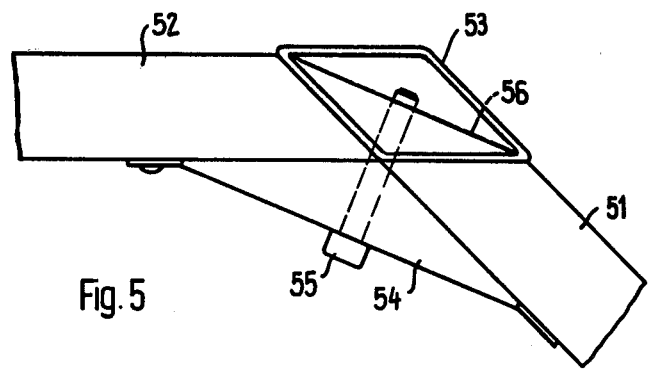
FIG. 5 is a top plan view of a joint similar to FIG. 1 having coplanar tube sections which form an angle larger than 90°.

FIG. 5 shows a further embodiment of a joint, wherein the coplanar frame parts 51 and 52 do not form a right angle. In this embodiment the cross-section of the third tube section 53 is such that its walls are in alignment with the walls of the coplanar tube sections. In this case the tensioning piece 54 is also designed in such a manner that it retains the coplanar tube sections 51 and 52 at the desired angle. The tensioning bolt 55 again extends diagonally to the third tube section 53 and is screwed into a clamping piece 56 with a triangular cross-section located inside of the third tube section. It is understood that a plurality of such configurations are possible and that, in this connection, arrangements are also possible wherein the walls of the third tube section are by no means in alignment with the walls of the adjoining coplanar tube sections.

On the whole, it must be said that, in the joint according to the invention, tension forces are only exerted on boundary portions of the tube walls on which deformation is not possible so that a joint of this type can take up very strong forces without slackening. In fact, this joint is of equal if not even superior quality as a welded joint.

Having thus fully described my invention, what I claim as new and wish to secure by Letters Patent is:

1. In a joint assembly for three tube sections forming the corner of a tube frame, including
   a. a first tube section having a first inner side, a second outer side, and two opposing walls which are perpendicular to the first side;
   b. a second tube section having a first inner side, a second outer side, and opposing walls which are perpendicular to the first side, said first and second tube sections being located in a common plane, the first side of said first section and the first side of said second section mutually facing each other;
   c. a third tube section which is arranged perpendicularly to said common plane, and having a plurality of walls including two adjoining lateral faces, with the ends of the first and second tube sections being pressed against said two adjoining lateral faces by a tensioning bolt; and d. a tensioning piece having ends which are hooked into openings provided in the mutually facing sides of the first and second tube sections, said tensioning bolt extending through a hole in said tensioning piece and engaging in a diagonally disposed threaded hole of the third tube section;

the improvement wherein:

the mutually facing sides of the first and second tube sections are exclusively restrained at locations which are immediately adjacent to the two opposing walls of the first and second tube sections;

the tensioning piece has a U-shaped cross section in a plane which is perpendicular to the common plane in which the first and second tube sections are located, said tensioning piece includes a transverse web extending transversely to the first and second tube sections and two spaced-apart legs which are parallel to said common plane in which the first and second tube sections are located, said U-shape being defined by said transverse web and said two spaced-apart legs; the mutually facing sides of the first and second tube sections have slots immediately adjacent to the opposing walls, the legs of the tensioning piece have boundary portions which engage in these slots; the bolt bears against the transverse web of the tensioning piece; and the legs of the tensioning piece are provided with slots, and the mutually facing sides of the first and second tube sections have wall portions which engage in the slots in the legs.

2. The joint assembly of claim 1 wherein each of the two lateral faces of the third tube section against which the first and second tube sections are pressed is loaded by a force oriented in a direction which is perpendicular to the respective lateral face.

3. The joint according to claim 1 wherein the slots in the legs of the tensioning piece are open towards the ends of the first and second tube sections which are pressed against the lateral faces of the third tube section.

4. The joint according to claim 1 wherein the first and second tube sections form a corner and the legs have a portion extending as far as the corner formed by the first and second tube sections, said extending portion abutting on the external surfaces of the mutually facing sides of the first and second tube sections.

5. The joint accordinfg to claim 1 wherein the transverse web of the tensioning piece has lobes at its ends, and the lobes bear against the external surfaces of the mutually facing sides of the first and second tube sections.

6. The joint according to claim 5 wherein at least one lobe of the tensioning piece is firmly connected to the tube section which it bears against.

7. The joint according to claim 1 wherein the third tube section has a pair of opposing corners with each corner being formed by one of said two adjoining lateral faces, the outer sides of the first and second tube sections abut against the two adjoining lateral faces at these corners, a clamping piece with a threaded hole is arranged inside of the third tube section, said clamping piece bracing itself essentially in said opposing corners of said third tube section.

8. The joint according to claim 7 wherein said two adjoining lateral faces against which the first and second tube sections are pressed form a corner with each other, the clamping piece essentially fills the corner formed by said two adjoining lateral faces, and the clamping piece forms a slightly more obtuse angle than the angle formed by said two adjoining lateral faces.

9. The joint according to claim 7 wherein the third tube section has at least one embossment for fixing the clamping piece.

10. The joint according to claim 9 wherein the embossment is located in the vicinity of the hole for the tensioning bolt.

11. The joint according to claim 7 wherein the clamping piece has a length which is approximately two to three times one of the dimensions of the cross section of the third tube section.

12. The joint according to claim 1 wherein the walls of the third tube section are provided with at least one protrusion for fixing the position of the third tube section with respect to the first and second tube sections.

13. The joint according to claim 1 wherein the outer side of at least one of the first and second tube sections approximately recedes by the amount of the wall thickness of the third tube section relative to the adjacent surface of the third tube section.

14. The joint according to claim 1 wherein the first and second tube sections have different widths, and the hole in the tensioning piece is arranged at such a distance off the center of said tensioning piece that it extends diagonally to the cross section of the third tube section.

15. In a joint assembly for three tube sections forming the corner of a tube frame, including a. a first tube section having a first inner side, a second outer side, and two opposing walls which are perpendicular to the first side;

b. a second tube section having a first inner side, a second outer side, and opposing walls which are perpendicular to the first side, said first and second tube sections being located in a common plane, the first side of said first section and the first side of said second section mutually facing each other;

c. a third tube section which is arranged perpendicularly to said common plane, and having a plurality of walls including two adjoining lateral faces, with the ends of the first and second tube sections being pressed against said two adjoining lateral faces by a tensioning bolt; and d. a tensioning piece having ends which are hooked into openings provided in the mutually facing sides of the first and second tube sections, said tensioning bolt extending through a hole in said tensioning piece and engaging in a diagonally disposed threaded hold of the third tube section;

the improvement wherein:

the mutually facing sides of the first and second tube sections are exclusively restrained at locations which are immediately adjacent to the two opposing walls of the first and second tube sections;

the tensioning piece has a U-shaped cross section in a plane which is perpendicular to the common plane in which the first and second tube sections are located, said tensioning piece includes a transverse web extending transversely to the first and second sections and two spaced-apart legs which are parallel to said common plane in which the first and second tube sections are located, said U-shape being defined by said transverse web and said two spaced-apart legs; the mutually facing sides of the first and second tube sections have slots immediately adjacent to the opposing walls, the legs of the tensioning piece have boundary portions which engage in these slots; the bolt bears against the tranverse web of the tensioning piece; and the transverse web of the tensioning piece has lobes at its ends, and the lobes bear against the external surfaces of the mutually facing sides of the first and second tube sections.

16. The joint according to claim 15 wherein at least one lobe of the tensioning piece is firmly connected to the tube section which it bears against.

17. In a joint assembly for three tube sections forming the corner of a tube frame, including
   a. a first tube section having a first inner side, a second outer side, and two opposing walls which are perpendicular to the first side;
   b. a second tube section having a first inner side, a second outer side, and opposing walls which are perpendicular to the first side,
   said first and second tube sections being located in a common plane, the first side of said first section and the first side of said second section mutually facing each other;
   c. a third tube section which is arranged perpendicularly to said common plane, and having a plurality of walls including two adjoining lateral faces, with the ends of the first and second tube sections being pressed against said two adjoining lateral faces by a tensioning bolt; and
   d. a tensioning piece having ends which are hooked into openings provided in the mutually facing sides of the first and second tube sections, said tensioning bolt extending through a hole in said tensioning piece and engaging in a diagonally disposed threaded hole of the third tube section;

the improvement wherein:

the mutually facing sides of the first and second tube sections are exclusively restrained at locations which are immediately adjacent to the two opposing walls of the first and second tube sections;

the tensioning piece has a U-shaped cross section in a plane which is perpendicular to the common plane in which the first and second tube sections are located, said tensioning piece includes a transverse web extending transversely to the first and second tube sections and two spaced-apart legs which are parallel to said common plane in which the first and second tube sections are located, said U-shaped being defined by said transverse web and said two spaced-apart legs; the mutually facing sides of the first and second tube sections have slots immediately adjacent to the opposing walls, the legs of the tensioning piece have boundary portions which engage in these slots; the bolt bears against the transverse web of the tensioning piece; and the third tube section has a pair of opposing corners with each corner being formed by one of said two adjoining lateral faces, the outer sides of the first and second tube sections abut against the two adjoining lateral faces at these corners, a clamping piece with a threaded hole is arranged inside of the third tube section, said clamping piece bracing itself essentially in said opposing corners of said third tube section.

18. The joint according to claim 17 wherein said two adjoining lateral faces against which the first and second tube sections are pressed form a corner with each other, the clamping piece essentially fills the corner formed by said two adjoining lateral faces, and the clamping piece forms a slightly more obtuse angle than the angle formed by said two adjoining lateral faces.

19. The joint according to claim 17 wherein the third tube section has at least one embossment for fixing the clamping piece.

20. The joint according to claim 19 wherein the embossment is located in the vicinity of the hole for the tensioning bolt.

21. The joint according to claim 17 wherein the clamping piece has a length which is approximately two to three times one of the dimensions of the cross section of the third tube section.

* * * * *